(12) United States Patent
Fukushima et al.

(10) Patent No.: US 10,923,702 B2
(45) Date of Patent: Feb. 16, 2021

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/411,694

(22) Filed: May 14, 2019

(65) Prior Publication Data
US 2019/0363327 A1    Nov. 28, 2019

(30) Foreign Application Priority Data

May 23, 2018    (JP) .................................. 2018-098637

(51) Int. Cl.
*H05K 5/00* (2006.01)
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC ................................ H01M 2/206; H05K 5/00
See application file for complete search history.

(56) References Cited

U.S. PATENT DOCUMENTS

2014/0065885 A1* 3/2014 Nakayama .......... H01M 10/482
439/627

FOREIGN PATENT DOCUMENTS

JP          2014-216270          11/2014

* cited by examiner

*Primary Examiner* — Jerry Wu
(74) *Attorney, Agent, or Firm* — Greenblum & Bernstein, P.L.C.

(57) ABSTRACT

A connection module to be attached to a power storage element group having a plurality of power storage elements includes a plurality of bus bars each connecting electrode terminals of adjacent power storage elements, a wire bundle that is a bundle of wires for transmitting information, and an insulating protector that holds the plurality of bus bars. The insulating protector includes a protector body that insulates the bus bars from each other and a wire fixing portion provided at a position of the protector body at which the wires are drawn out, and the wire fixing portion includes an extension portion to which the wire bundle is to be fixed and that extends from an end portion of the protector body in a direction in which the wire bundle is drawn out, and a reinforcing portion that is continuous with the extension portion and the protector body.

14 Claims, 14 Drawing Sheets

[FIG. 13]
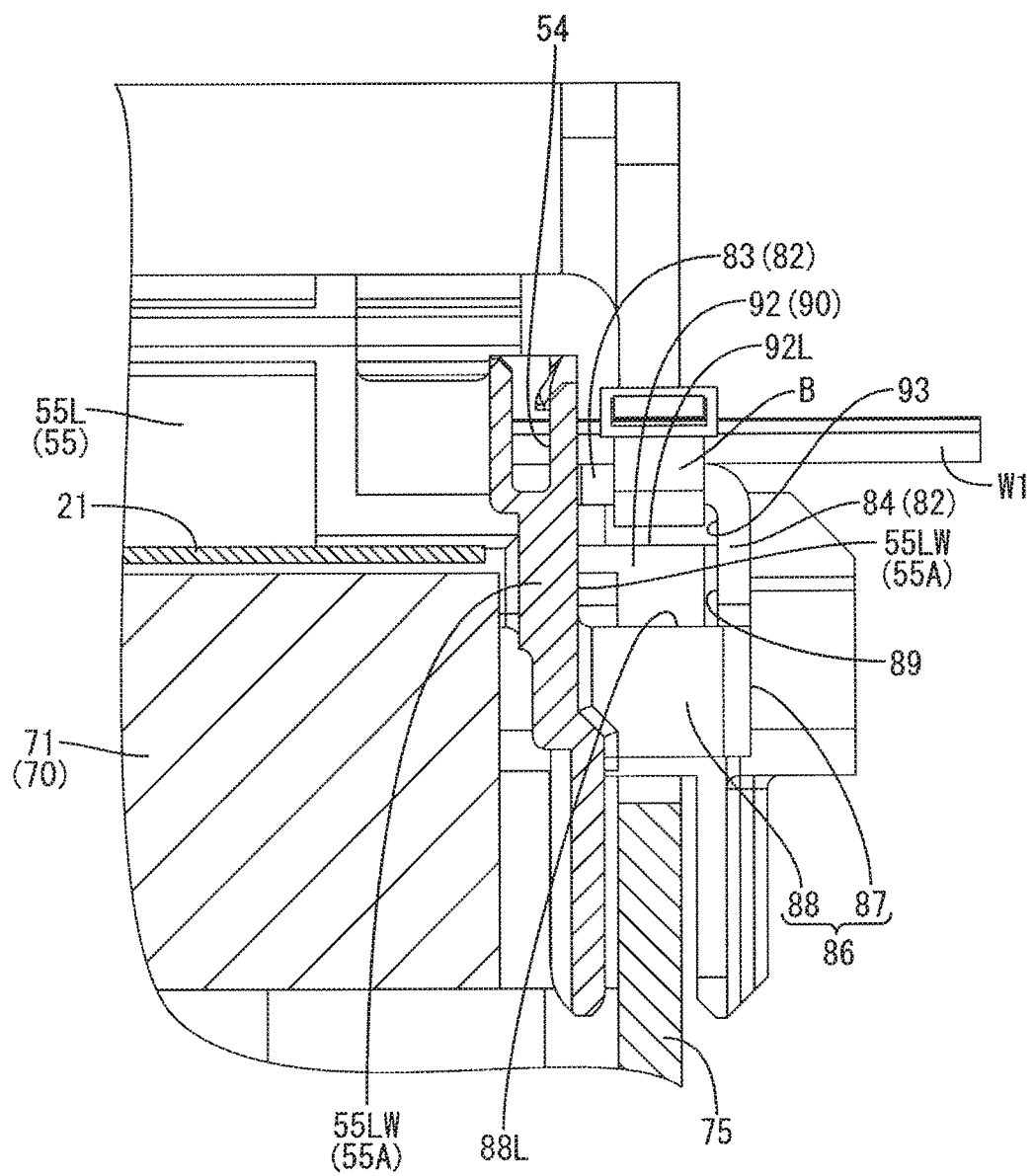

[FIG. 14]
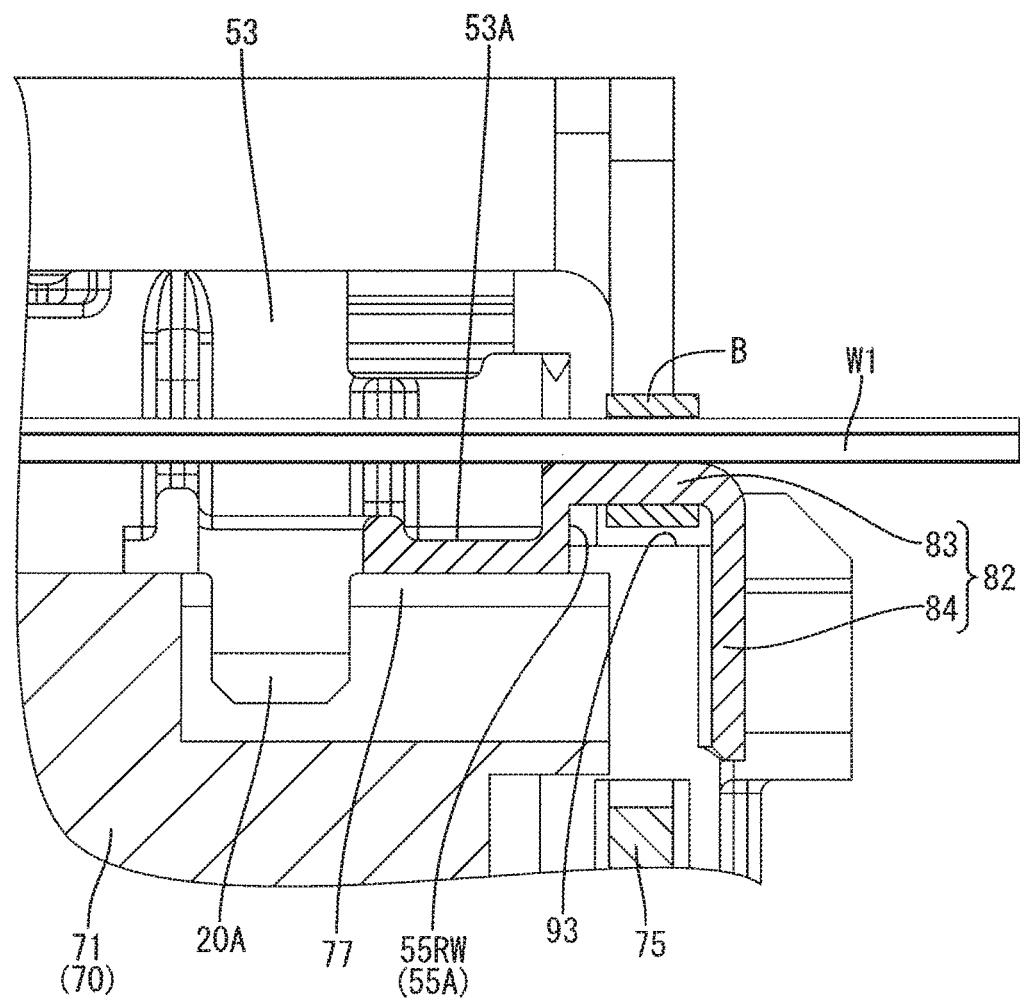

CONNECTION MODULE

TECHNICAL FIELD

The present specification discloses a technique relating to a connection module.

BACKGROUND ART

As a bus bar module that is attached to a cell assembly constituted by a plurality of cells, for example, a bus bar module disclosed in JP 2014-216270A (Patent Document 1 below) is known. This bus bar module includes a wire bundle that is a bundle of wires for voltage detection or temperature detection of bus bars, and this wire bundle is fixed to a wire draw-out portion that is provided on a housing member that houses the wire bundle and drawn to the outside.

JP 2014-216270A is an example of related art.

SUMMARY OF THE INVENTION

However, the wire fixing portion described above is supported at only one end and extends from an end portion of the housing member in a direction in which the wires are drawn out. Therefore, if an external force is applied to the drawn-out wires, the wire fixing portion may be damaged due to flexural deformation or the like. Further, the above-described wire fixing portion has a cutout or a hole for wrapping a binding band, making for a configuration that further reduces rigidity of the wire fixing portion.

The present specification discloses a technique that ensures the strength of a portion to which wires are fixed.

The technique disclosed in the present specification relates to a connection module to be attached to a power storage element group that is constituted by a plurality of power storage elements arranged side by side, including a plurality of bus bars each connecting adjacent power storage elements among the power storage elements, a wire bundle that is a bundle of wires for transmitting information regarding the bus bars or the power storage elements, and an insulating protector that holds the plurality of bus bars, wherein the insulating protector includes a protector body that insulates the bus bars from each other and a wire fixing portion that is provided at a position of the protector body at which the wires are drawn out, and the wire fixing portion includes an extension portion to which the wire bundle is to be fixed and that extends from an end portion of the protector body in a direction in which the wire bundle is drawn out, and a reinforcing portion that is continuous with the extension portion and the protector body.

According to the connection module configured as described above, the extension portion to which the wire bundle is fixed can be reinforced with the reinforcing portion continuous with the protector body. Thus, the strength of the extension portion to which the wires are fixed can be ensured.

The connection module disclosed in the present specification may have the following configuration.

The reinforcing portion may be continuous with an extended end portion of the extension portion.

For example, in a case where the reinforcing portion is continuous with a midway position of the extension portion, an external force may be applied to the extension portion as a result of another member being caught on the extension end of the extension portion, for example. However, according to the above configuration, it is possible to keep another member from being caught on the extension portion. That is, it is possible to reduce a situation in which an external force is applied to the extension portion.

A pair of the reinforcing portions may be provided on respective sides of the extension portion so as to branch from an extension end of the extension portion.

In this configuration, the pair of reinforcing portions are provided on the respective sides of the extension portion so as to branch from the extension end of the extension portion, and therefore as compared with, for example, a case where a single reinforcing portion is provided or a reinforcing portion is provided on only one side of the extension portion, the strength of the extension portion can be increased and another member can be kept from coming into contact with the extension portion from both sides thereof.

It is possible to employ a configuration in which the wire fixing portion has a first insertion hole and a second insertion hole, the first insertion hole being constituted by a first reinforcing portion that is one of the reinforcing portions, the protector body, and the extension portion, and the second insertion hole being constituted by a second reinforcing portion that is one of the reinforcing portions different from the first reinforcing portion, the protector body, and the extension portion, the wire bundle is to be fixed to the extension portion by wrapping a band-shaped binding member that is passed through the first insertion hole and the second insertion hole, and the first insertion hole is larger than the second insertion hole as a result of the first reinforcing portion being located farther from the extension portion than the second reinforcing portion is.

According to this configuration, when the wire bundle is to be fixed to the extension portion by wrapping the binding member, the binding member can be easily inserted into the first insertion hole. Therefore, as compared with, for example, a case where the size of the first insertion hole is the same as or smaller than that of the second insertion hole, the operation for fixing the wire bundle to the extension portion can be performed smoothly, easily, and efficiently.

The first insertion hole and the second insertion hole may be arranged on a straight line so as to face each other.

According to this configuration, the band-shaped binding member can be easily passed through the first insertion hole toward the second insertion hole. Therefore, the operation for fixing the wire bundle to the extension portion can be performed smoothly and efficiently.

A dimension of a space between the extension portion and an imaginary straight line that connects an edge portion of the first reinforcing portion that constitutes the first insertion hole and an edge portion of the second reinforcing portion that constitutes the second insertion hole may be greater than a plate thickness of the binding member.

According to this configuration, the binding member can be passed through the first insertion hole toward the second insertion hole along the edge portion of the first reinforcing portion and the edge portion of the second reinforcing portion. That is, the edge portion of the first reinforcing portion and the edge portion of the second reinforcing portion can be used as a guide for the binding member, and therefore the operation for fixing the wire bundle to the extension portion can be performed smoothly and efficiently.

It is possible to employ a configuration in which the protector body includes a groove-shaped wiring path within which the wires are disposed, and a plurality of bus bar holding portions that individually house the bus bars and are located on respective sides of the wiring path to be adjacent thereto, one of a pair of the reinforcing portions is continuous with an outer wall of a bus bar holding portion that is located on one side of the wiring path, and the other of the pair of the reinforcing portions is continuous with an outer wall of a bus bar holding portion that is located on one side of the wiring path different from the one side.

Since the bus bar holding portions are provided with the groove-shaped wiring path interposed therebetween, the protector body may deform along the wiring path such that the bus bar holding portions approach each other. However, one of the reinforcing portions is continuous with the outer wall of the bus bar holding portion located on one side, and the other reinforcing portion is continuous with the outer wall of the bus bar holding portion located on the other side. That is, rigidity of the protector body can be improved at the end portion of the protector body, and the protector body can be kept from deforming along the wiring path such that the bus bar holding portions approach each other.

According to the technique disclosed in the present specification, it is possible to ensure the strength of the portion to which the wires are fixed.

BRIEF DESCRIPTION OF THE DRAWINGS

FIG. 13 is a cross-sectional view taken along a line C-C in FIG. 11.

FIG. 14 is a cross-sectional view taken along a line D-D in FIG. 11.

EMBODIMENTS OF THE INVENTION

Embodiment

The following describes an embodiment of the technique disclosed in the present specification with reference to FIGS. 1 to 14.

Figure 1:
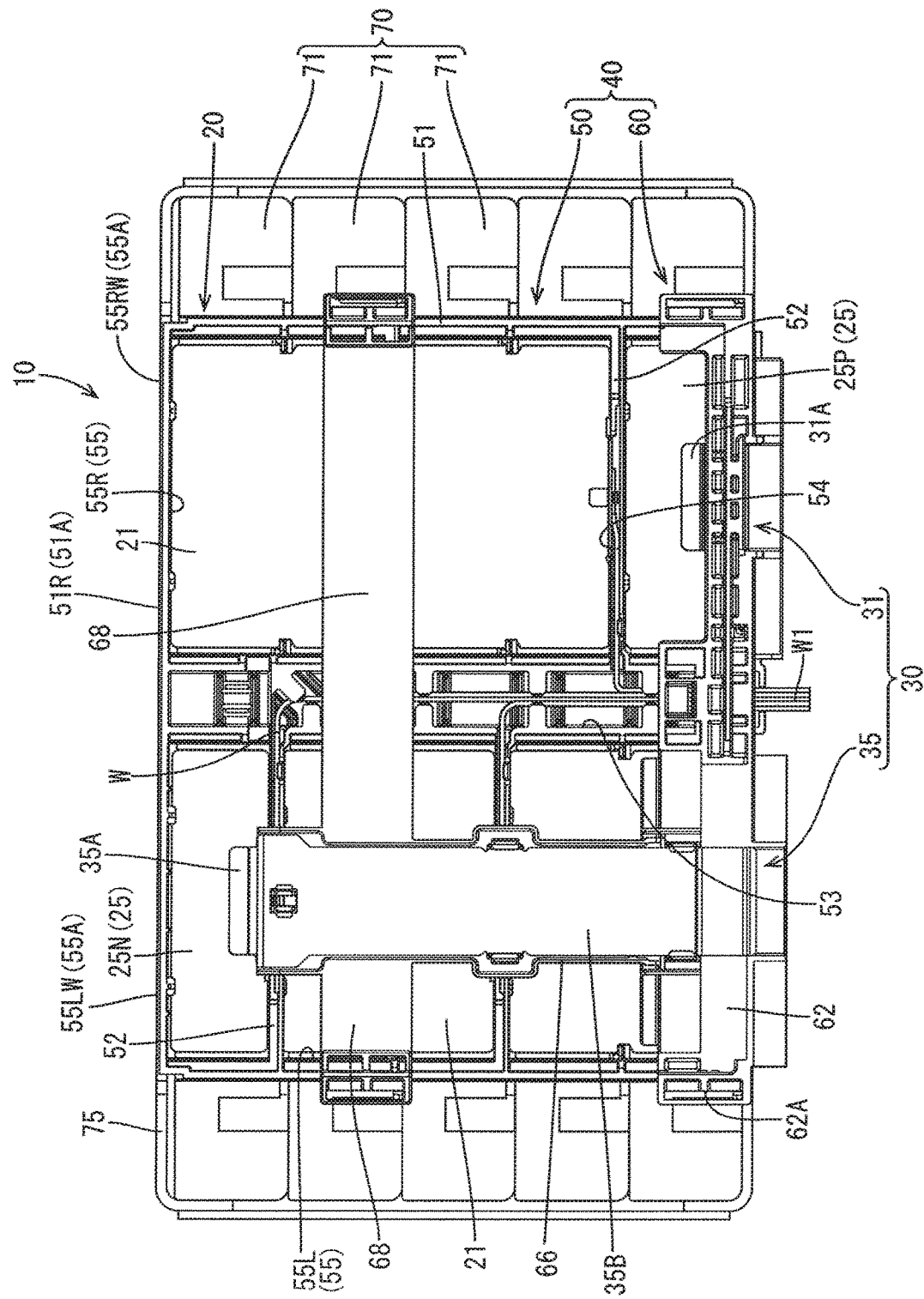
FIG. 1 is a plan view of a power storage module.
Figure 2:
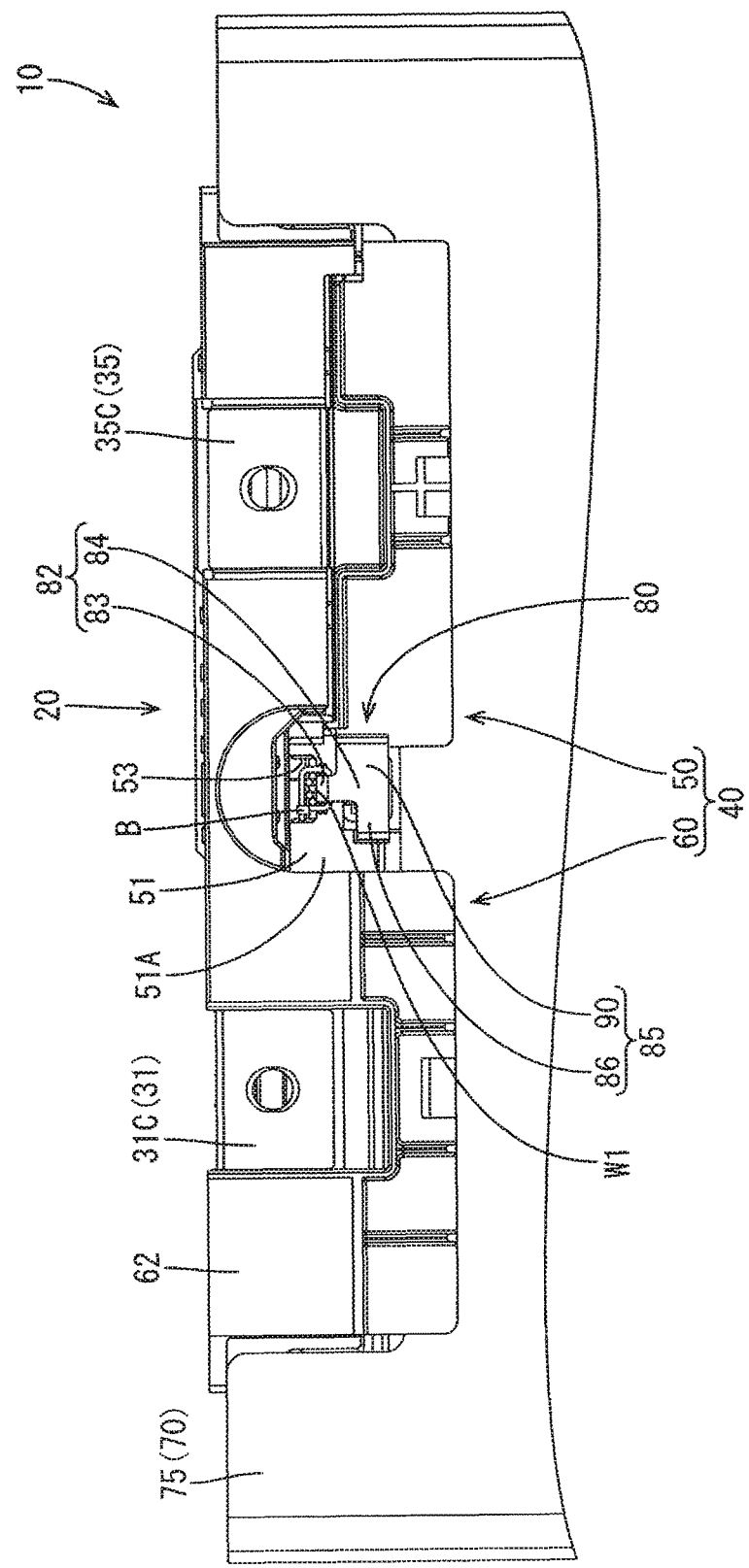
FIG. 2 is a front view of the power storage module.
Figure 3:
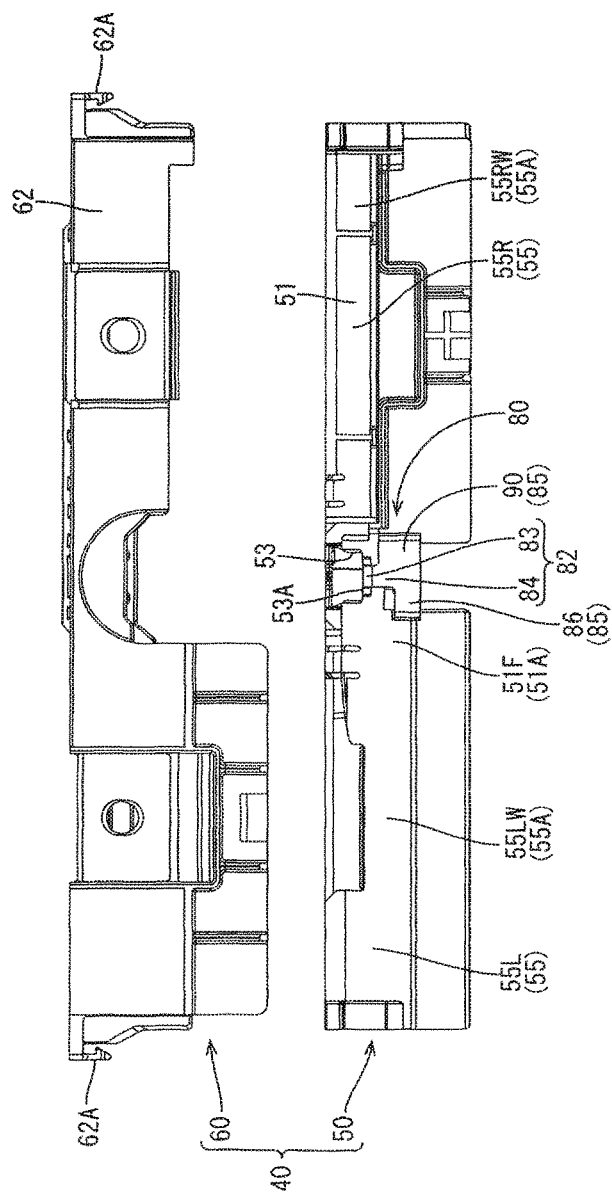
FIG. 3 is a front view illustrating a state before a second protector is attached to a first protector.

The present embodiment relates to a power storage module 10 that is installed in a vehicle such as an electric automobile or hybrid automobile and used as a power source for driving the vehicle, for example, and as illustrated in FIGS. 1 to 3, the power storage module 10 includes a power storage element group 70 that is constituted by a plurality of power storage elements 71 arranged side by side and a connection module 20 that is attached to the power storage element group 70.

Each of the power storage elements 71 is, for example, a secondary battery, and as illustrated in FIG. 1, the power storage element group 70 is constituted by a plurality of (five in the present embodiment) power storage elements 71 housed in a frame 75 that is substantially rectangular in a plan view.

A non-illustrated pair of flat electrode terminals are disposed on an upper surface of each power storage element 71 at positions near respective ends in the left-right direction. One of the electrode terminals is a positive electrode terminal and the other is a negative electrode terminal. The power storage elements 71 are housed in the frame 75 so as to be lined up in the front-rear direction such that electrode terminals of different polarities are adjacent to each other in two power storage elements 71 that are adjacent in the front-rear direction (that is, a positive electrode terminal of one of the adjacent power storage elements 71 and a negative electrode terminal of the other power storage element 71 are adjacent to each other).

A to-be-locked portion 77 to which a pair of locking portions 20A provided in the connection module 20 are to be fitted is provided between each pair of electrode terminals disposed on the top of each power storage element 71. When the pair of locking portions 20A are fitted to the to-be-locked portion 77 and the pair of locking portions 20A and the to-be-locked portion 77 are locked in the up-down direction, the connection module 20 is fixedly held above the power storage element group 70.

As illustrated in FIG. 1, the connection module 20 includes: a plurality of bus bars 21 that each connect a positive electrode terminal and a negative electrode terminal of power storage elements 71 that are adjacent in the front-rear direction; end bus bars 25 that are each connected to one of electrode terminals that are located at the front and rear ends in the direction of arrangement of the power storage elements 71 of the power storage element group 70; a pair of external connection bus bars 30 that are connected to the end bus bars 25 and to which a non-illustrated external device is to be connected; and an insulating protector 40 that holds the bus bars 21, the end bus bars 25, and the external connection bus bars 30 while insulating these bus bars 21, 25, and 30 from each other.

Figure 4:
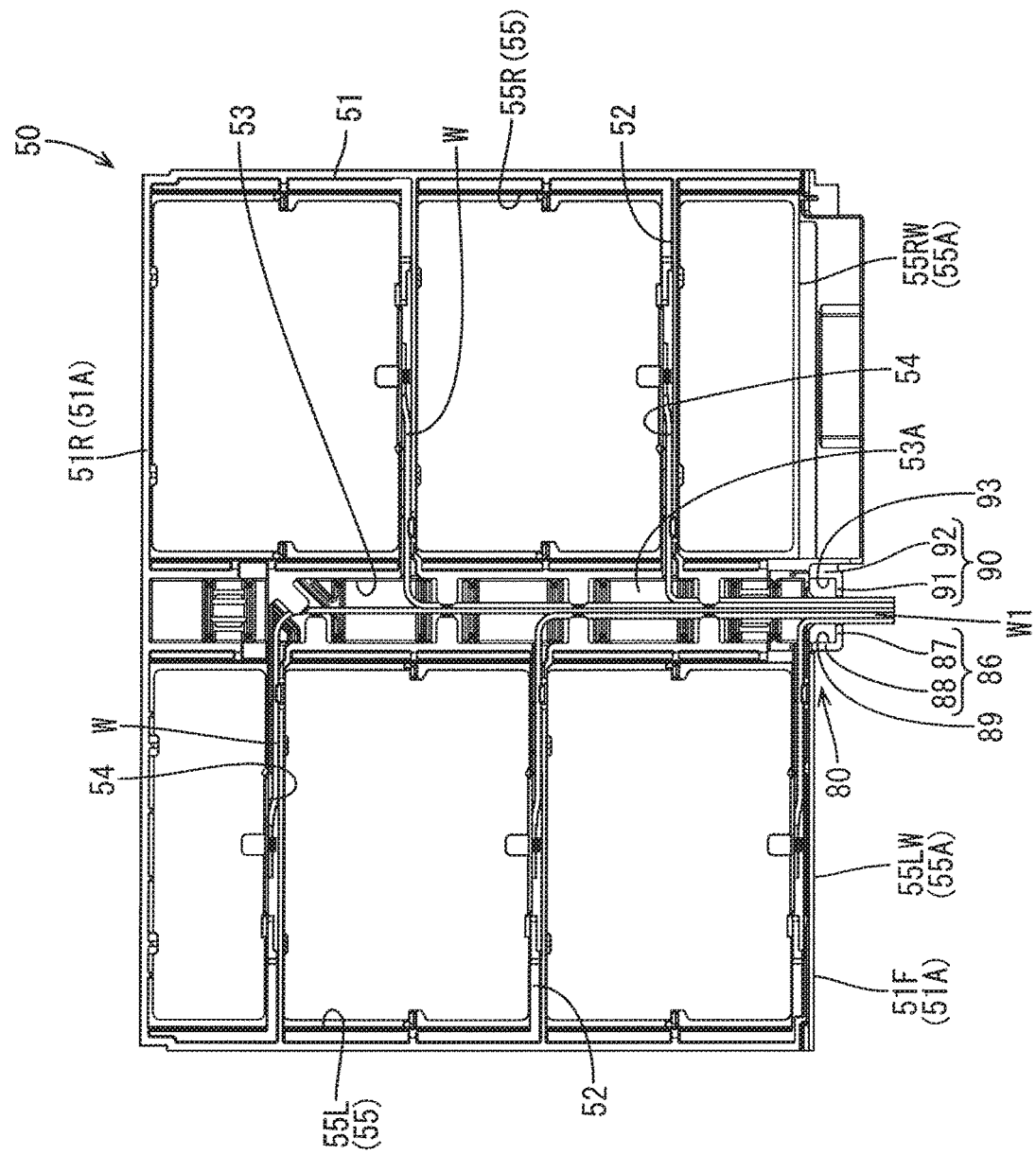
FIG. 4 is a plan view of the first protector.

Each of the bus bars 21 is formed, for example, by pressing a plate of metal that has excellent electric conductivity such as copper, a copper alloy, aluminum, an aluminum alloy, or stainless steel (SUS), or a metal plate obtained by sticking together an aluminum plate and a copper plate, to have the shape of a substantially rectangular plate that is slightly elongated in the left-right direction (see FIG. 4).

As illustrated in FIG. 1, each bus bar 21 is large enough that it is placed on power storage elements 71 that are adjacent in the front-rear direction, spanning from an electrode terminal of one of the adjacent power storage elements 71 to an electrode terminal of the other power storage element 71, and as a result of end portions of the bus bar 21 in the front-rear direction being electrically connected to the respective electrode terminals through welding or the like, the bus bar 21 serially connects the adjacent power storage elements 71. Note that, in the present embodiment, the adjacent power storage elements 71 are serially connected by arranging the adjacent power storage elements 71 such that electrode terminals of different polarities are adjacent to each other. However, some adjacent power storage elements 71 of the power storage element group 70 may be connected in parallel by arranging the adjacent power storage elements 71 such that electrode terminals of the same polarity are adjacent to each other.

Each of the end bus bars 25 is formed, for example, by pressing a plate of metal that has excellent electric conductivity such as copper, a copper alloy, aluminum, an aluminum alloy, or stainless steel (SUS) to have the shape of a substantially rectangular plate that is elongated in the left-right direction, and as illustrated in FIGS. 1 and 4, the length dimension of the end bus bars 25 in the front-rear direction is approximately half of that of the bus bars 21. In the present embodiment, the end bus bars 25 are respectively located at the rear left end and the front right end, where the end bus bar 25 located at the rear left end is a negative-electrode end bus bar 25N that is connected to the negative electrode terminal of the power storage element 71 located at the rear end, and the end bus bar 25 located at the front right end is a positive-electrode end bus bar 25P that is connected to the positive electrode terminal of the power storage element 71 located at the front end.

Each of the pair of external connection bus bars 30 is formed, for example, by pressing a plate of metal that has excellent electric conductivity such as copper, a copper alloy, aluminum, an aluminum alloy, or stainless steel (SUS).

One of the pair of external connection bus bars 30 is a positive-electrode external connection bus bar 31 that is short in the front-rear direction, and the other of the pair of external connection bus bars 30 is a negative-electrode external connection bus bar 35 that is long in the front-rear direction.

As illustrated in FIG. 1, the positive-electrode external connection bus bar 31 includes: a first bus bar connecting portion 31A that is electrically connected to an upper surface of the positive-electrode end bus bar 25P of the power storage element group 70 through welding or the like; and a first terminal connecting portion 31C that is fastened to a non-illustrated positive electrode terminal of an external device using a bolt, and when the plurality of power storage elements 71 are serially connected by the bus bars 21, electric power from a positive electrode of the power storage element group 70 is output via the positive-electrode end bus bar 25P to the positive-electrode external connection bus bar 31.

The negative-electrode external connection bus bar 35 includes: a second bus bar connecting portion 35A that is electrically connected to an upper surface of the negative electrode end bus bar 25N of the power storage element group 70 through welding or the like; a second terminal connecting portion 35C that is fastened to a non-illustrated negative electrode terminal provided on the external device using a bolt; and a long linkage portion 35B that is long in the front-rear direction and connects the second bus bar connecting portion 35A and the second terminal connecting portion 35C, and when the plurality of power storage elements 71 are serially connected by the bus bars 21, electric power from a negative electrode of the power storage element group 70 is output via the negative-electrode end bus bar 25N to the negative-electrode external connection bus bar 35.

The insulating protector 40 includes a first protector 50 that holds the plurality of bus bars 21 and the second protector 60 that holds the pair of external connection bus bars 30.

The first protector 50 is an insulating member made of a synthetic resin and includes a protector body 51 that has the shape of a substantially rectangular frame as illustrated in FIGS. 1 and 4. The inside of the protector body 51 is partitioned with partition walls 52 to provide bus bar holding portions 55 that individually hold the plurality of bus bars 21.

The bus bar holding portion 55 has a substantially rectangular shape in a plan view, is open at the top and the bottom, and holds a bus bar 21 therein. The upper opening of the bus bar holding portion 55 has a substantially rectangular shape that is approximately the same as the external shape of a bus bar 21, and the bus bar 21 is held within the bus bar holding portion 55 by a non-illustrated supporting portion that is provided at the bottom of the bus bar holding portion 55. The bus bars 21 held by the respective bus bar holding portions 55 serially connect the plurality of power storage elements 71.

A main path 53 that extends in the front-rear direction is provided in an approximately central portion of the protector body 51 in the left-right direction. The main path 53 has the shape of a downwardly recessed groove and extends from a position slightly forward of a rear wall 51R of the protector body 51 to a front wall 51F of the protector body 51. The main path 53 branches into branch paths 54 that each have the shape of a recess and are provided in the partition walls 52, and the main path 53 and the branch paths 54 communicate in the left-right direction.

Wires W for detecting and transmitting information regarding the bus bars 21 are disposed within the branch paths 54 so as to be electrically connected to the bus bars 21. The wires W disposed within the respective branch paths 54 are drawn to the main path 53, and a wire bundle W1 that is a bundle of wires W is disposed on a bottom portion 53A of the main path 53 in a front end portion of the main path 53.

The same number of (three in the present embodiment) bus bar holding portions 55 are arranged on both sides of the main path 53 in the left-right direction in a staggered manner in the front-rear direction, and a left-side bus bar holding portion 55L that is located on the left side, i.e., one side, of the main path 53 and a right-side bus bar holding portion 55R that is located on the right side, i.e., the other side, of the main path 53 are connected in the left-right direction via the bottom portion 53A of the main path 53. Accordingly, in the central portion in the left-right direction in which the main path 53 is provided, an outer wall 51A of the protector body 51, which is constituted by outer walls 55A of the bus bar holding portions 55, has a height dimension in the up-down direction that is smaller than the height dimension of the bus bar holding portions 55 respectively located on the left and right sides.

The second protector 60 is an insulating member made of a synthetic resin and, as illustrated in FIG. 1, includes a front bus bar holding portion 62 that holds a front end portion of the negative-electrode external connection bus bar 35 and the positive-electrode external connection bus bar 31, a middle bus bar holding portion 66 that holds the long linkage portion 35B of the negative-electrode external connection bus bar 35, and a pair of fixing portions 68 that extend from the middle bus bar holding portion 66.

As illustrated in FIGS. 1 to 3, the front bus bar holding portion 62 is elongated in the left-right direction, and as a result of a pair of front-side locking pieces 62A provided in both end portions of the front bus bar holding portion 62 and non-illustrated to-be-locked portions of the first protector 50 being locked in the up-down direction, the second protector 60 is fixed to the first protector 50.

As illustrated in FIG. 1, the front end portion of the negative-electrode external connection bus bar 35 is disposed on the left side of an approximately central portion of the front bus bar holding portion 62 in the left-right direction, and the positive-electrode external connection bus bar 31 is held on the right side of the approximately central portion of the front bus bar holding portion 62 in the left-right direction.

As illustrated in FIG. 1, the middle bus bar holding portion 66 extends straight in the front-rear direction and is configured to hold the long linkage portion 35B of the negative-electrode external connection bus bar 35 from below.

As illustrated in FIG. 1, the pair of fixing portions 68 extend in the left-right direction from a rear portion of the middle bus bar holding portion 66. Extended end portions of the fixing portions 68 can be locked with non-illustrated to-be-locked portions of the first protector 50 in the up-down direction, and the second protector 60 is fixed to the first protector 50 as a result of the extended end portions of the fixing portions 68 being locked with the to-be-locked portions.

The first protector 50 includes a wire fixing portion 80 for fixing the wire bundle W1 disposed within the main path 53.

Figure 9:
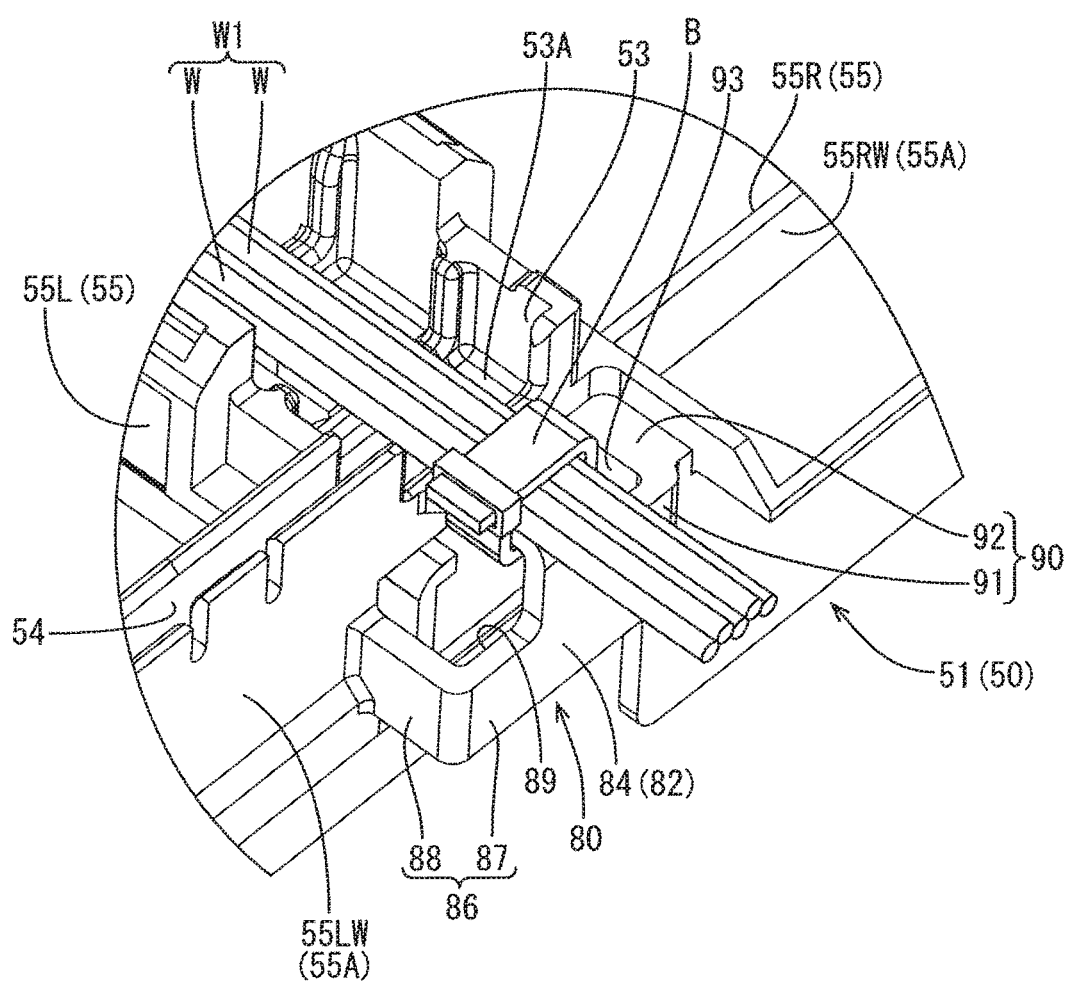
FIG. 9 is an enlarged perspective view illustrating a state in which a wire bundle fixed to an extension portion using a binding member.
Figure 10:
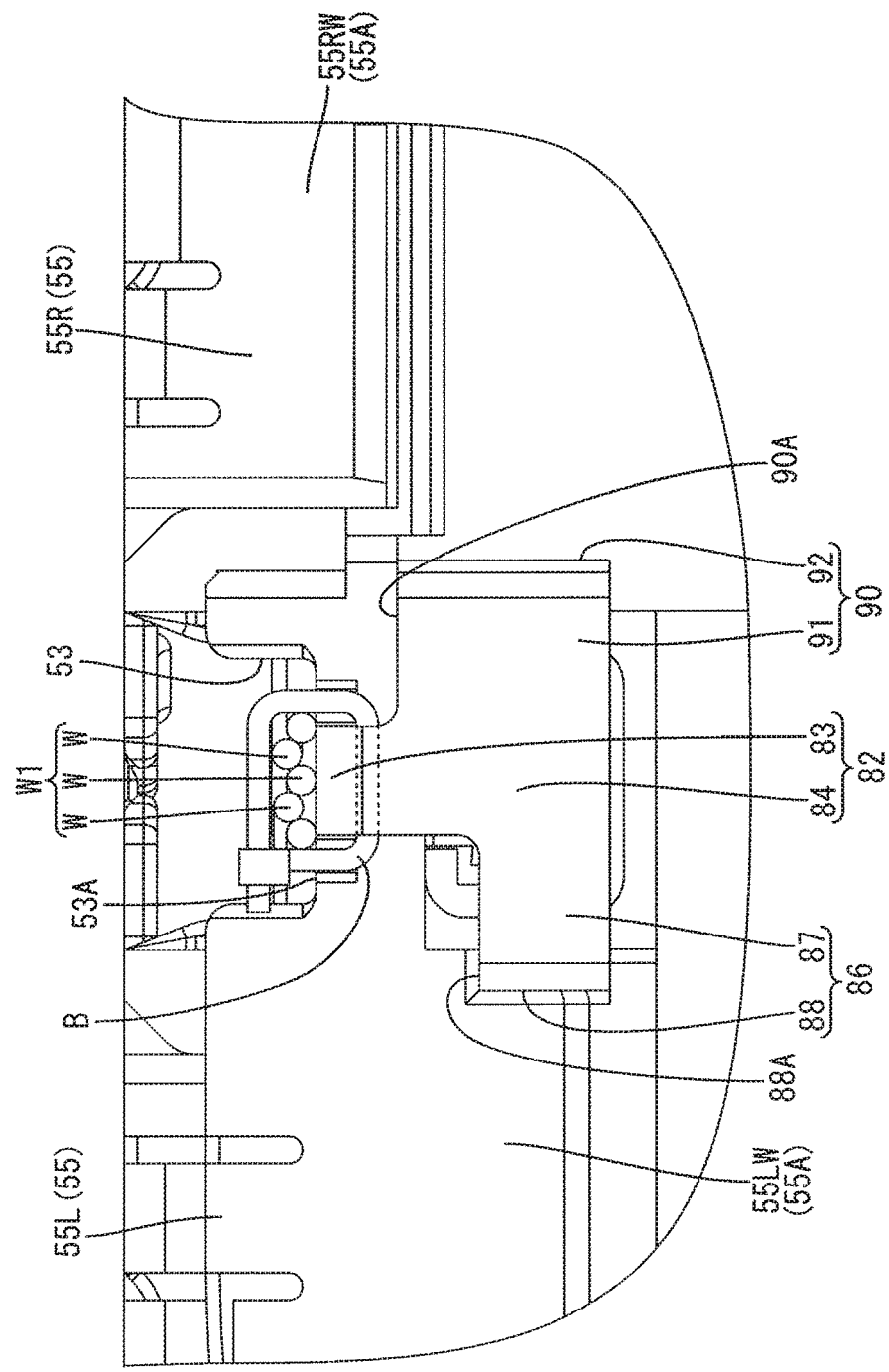
FIG. 10 is an enlarged front view illustrating a state in which the wire bundle is fixed to the extension portion using the binding member.
Figure 11:
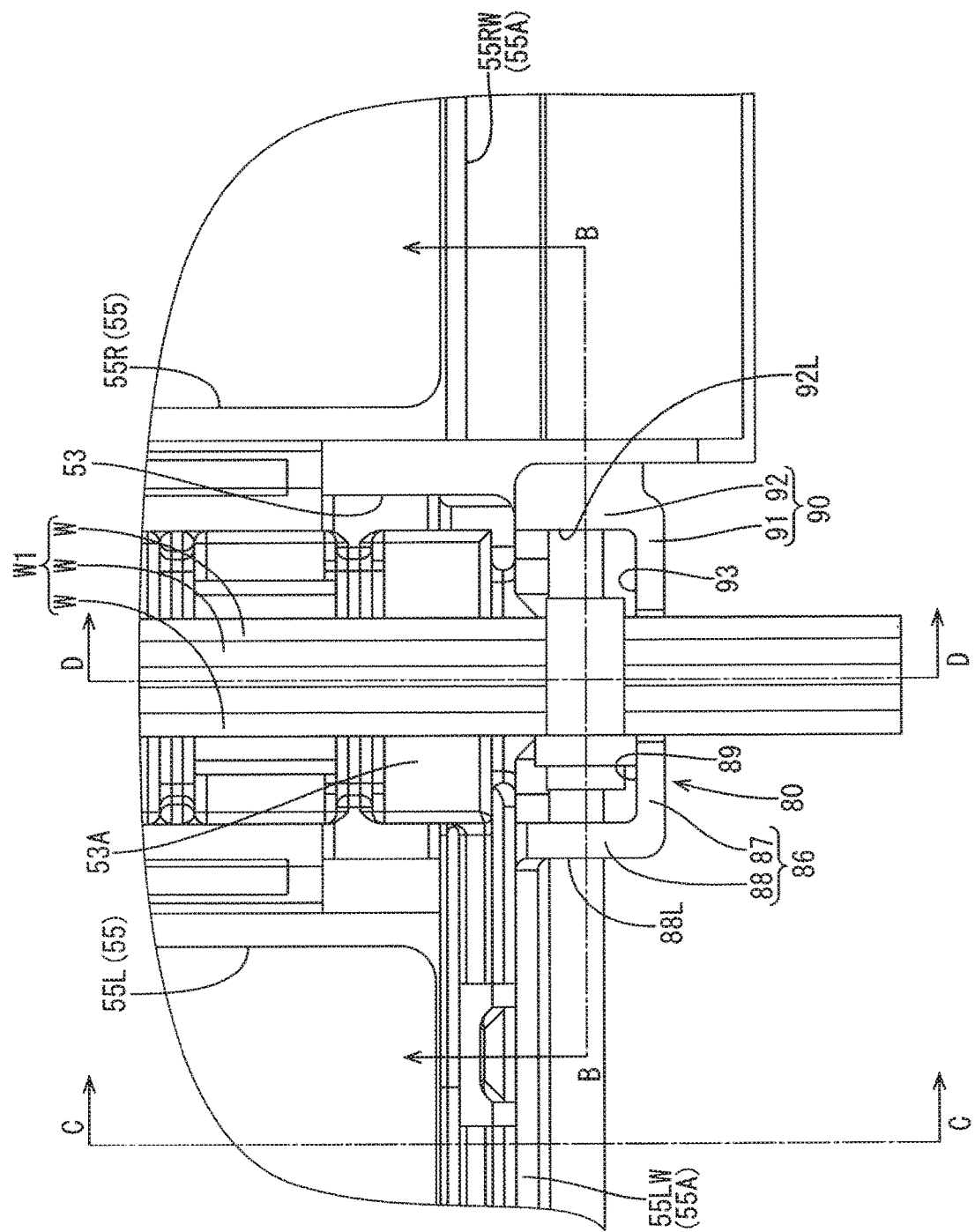
FIG. 11 is an enlarged plan view illustrating a state in which the wire bundle is fixed to the extension portion using the binding member.

As illustrated in FIGS. 9 to 11, the wire fixing portion 80 includes an extension portion 82 that extends forward along the wire bundle W1 drawn forward from the front wall 51F, which is the outer wall 51A of the protector body 51, and a pair of reinforcing portions 85 that are provided to be continuous with a hook portion 84, which is provided in an extended end portion of the extension portion 82, so as to branch in two directions, i.e., left and right.

Figure 5:
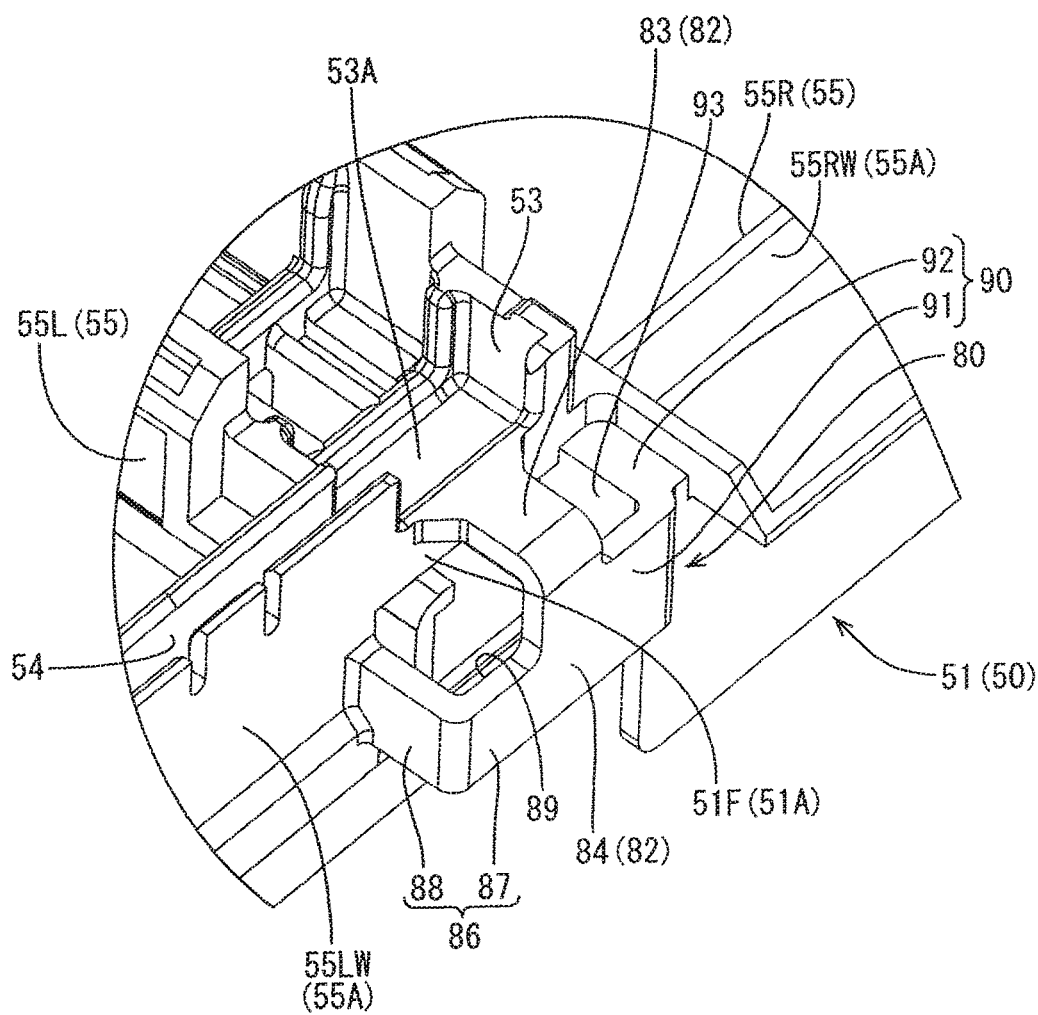
FIG. 5 is an enlarged perspective view illustrating a wire fixing portion from diagonally above.

As illustrated in FIGS. 5, 9, and 14, the extension portion 82 includes a main body portion 83 that has the shape of a plate extending forward from the bottom portion 53A of the main path 53 in the protector body 51, and a front end of the main body portion 83, which is the extended end portion of the extension portion 82, is constituted by the hook portion 84 that has the shape of a plate extending downward.

The wire bundle W1 drawn forward from the front wall 51F of the protector body 51 can be placed on an upper surface of the main body portion 83. As illustrated in FIGS. 9 to 14, the wire bundle W1 is fixed to the extension portion 82 by placing the wire bundle W1 on the upper surface of the main body portion 83 and wrapping a band-shaped binding member B around the main body portion 83 and the wire bundle W1 to bind them.

Figure 6:
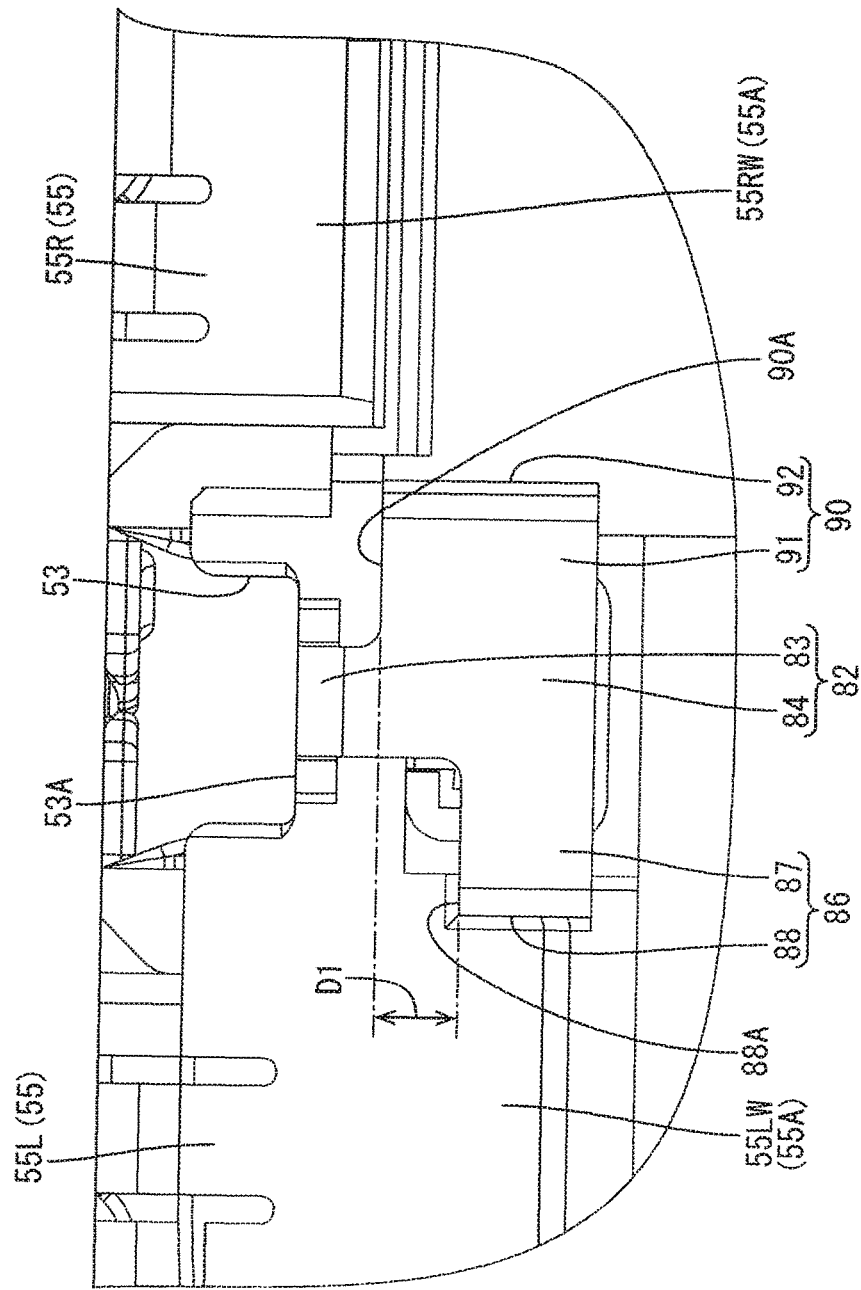
FIG. 6 is an enlarged front view of the wire fixing portion.

As illustrated in FIGS. 5 and 6, the pair of reinforcing portions 85 are formed to be continuous with side edges of the hook portion 84 of the extension portion 82 and constituted by a first reinforcing portion 86 that is continuous with the left side edge of the hook portion 84 and a second reinforcing portion 90 that is continuous with the right side edge of the hook portion 84.

Figure 7:
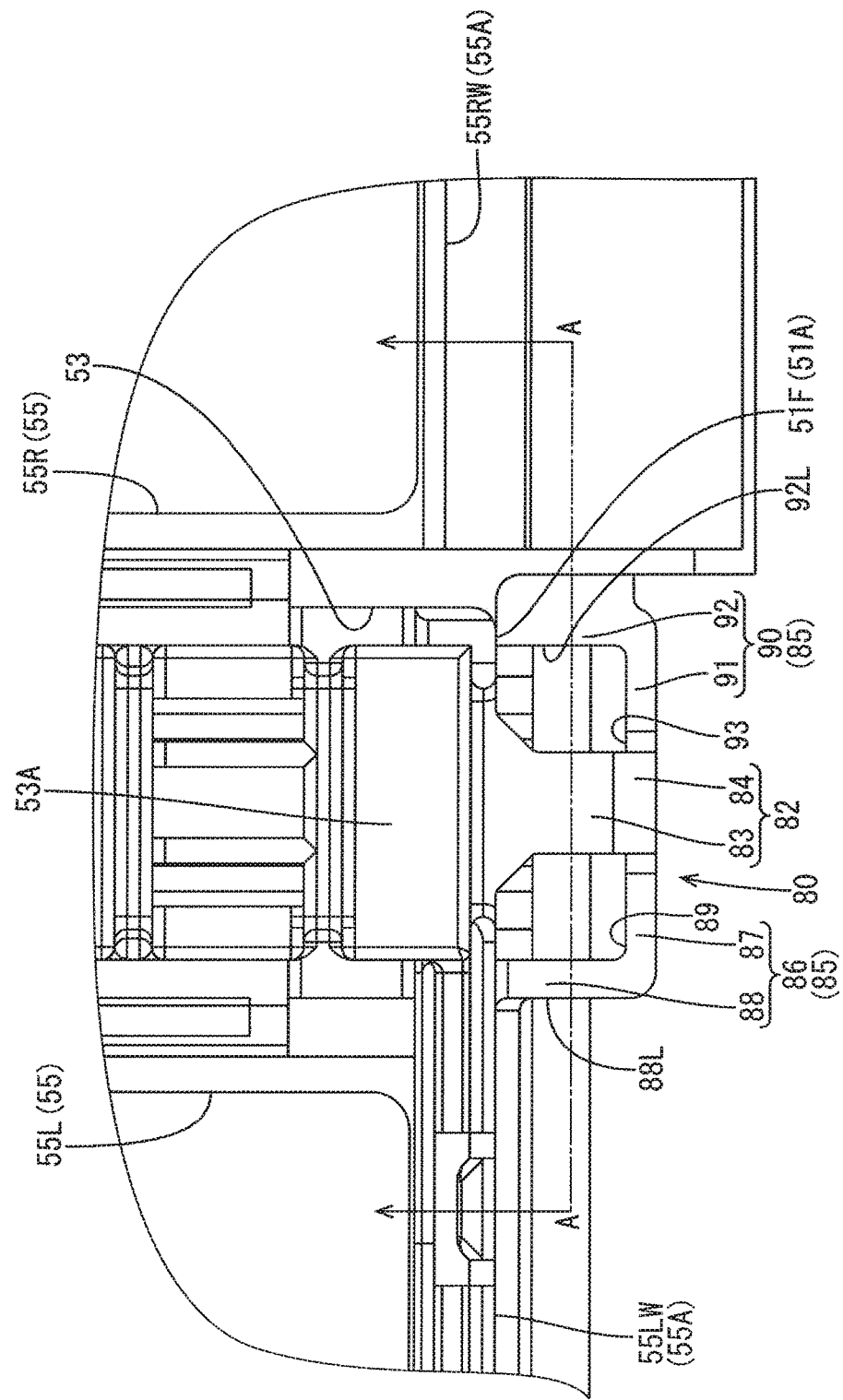
FIG. 7 is an enlarged plan view of the wire fixing portion.

As illustrated in FIGS. 5 and 7, the first reinforcing portion 86 has a first front wall 87 that is continuous with the left side edge of the hook portion 84 from a lower end portion thereof to the position of an approximately central portion thereof in the up-down direction and a first side wall 88 that extends straight from a left end portion of the first front wall 87 to the protector body 51.

The first front wall 87 has the shape of a plate that extends straight in the left direction from the hook portion 84, and the first side wall 88 has the shape of a plate that has the same height dimension as the first front wall 87 and is continuous with an outer wall 55LW of the left-side bus bar holding portion 55L located on the left side (one side) of the main path 53 in the protector body 51.

Since the first reinforcing portion 86 is continuous with the hook portion 84 of the extension portion 82 and the front wall 51F of the protector body 51 (outer wall 55LW of the left-side bus bar holding portion 55L), the first reinforcing portion 86, the extension portion 82, and the protector body 51 constitute a first insertion hole 89 as illustrated in FIGS. 5 and 7.

On the other hand, the second reinforcing portion 90 has a second front wall 91 that is continuous with approximately the entire right side edge of the hook portion 84 and a second side wall 92 that extends straight from a right end portion of the second front wall 91 to the protector body 51.

The second front wall 91 has the shape of a plate that extends straight rightward from the hook portion 84, and the second side wall 92 has the shape of a plate that has the same height dimension as the second front wall 91 and is continuous with an outer wall 55RW of the right-side bus bar holding portion 55R located on the right side (other side) of the main path 53 in the protector body 51.

Since the second reinforcing portion 90, which has a height dimension that is approximately twice that of the first reinforcing portion 86, is continuous with the hook portion 84 of the extension portion 82 and the front wall 51F of the protector body 51 as illustrated in FIG. 6, the second reinforcing portion 90, the extension portion 82, and the protector body 51 constitute a second insertion hole 93.

Figure 8:
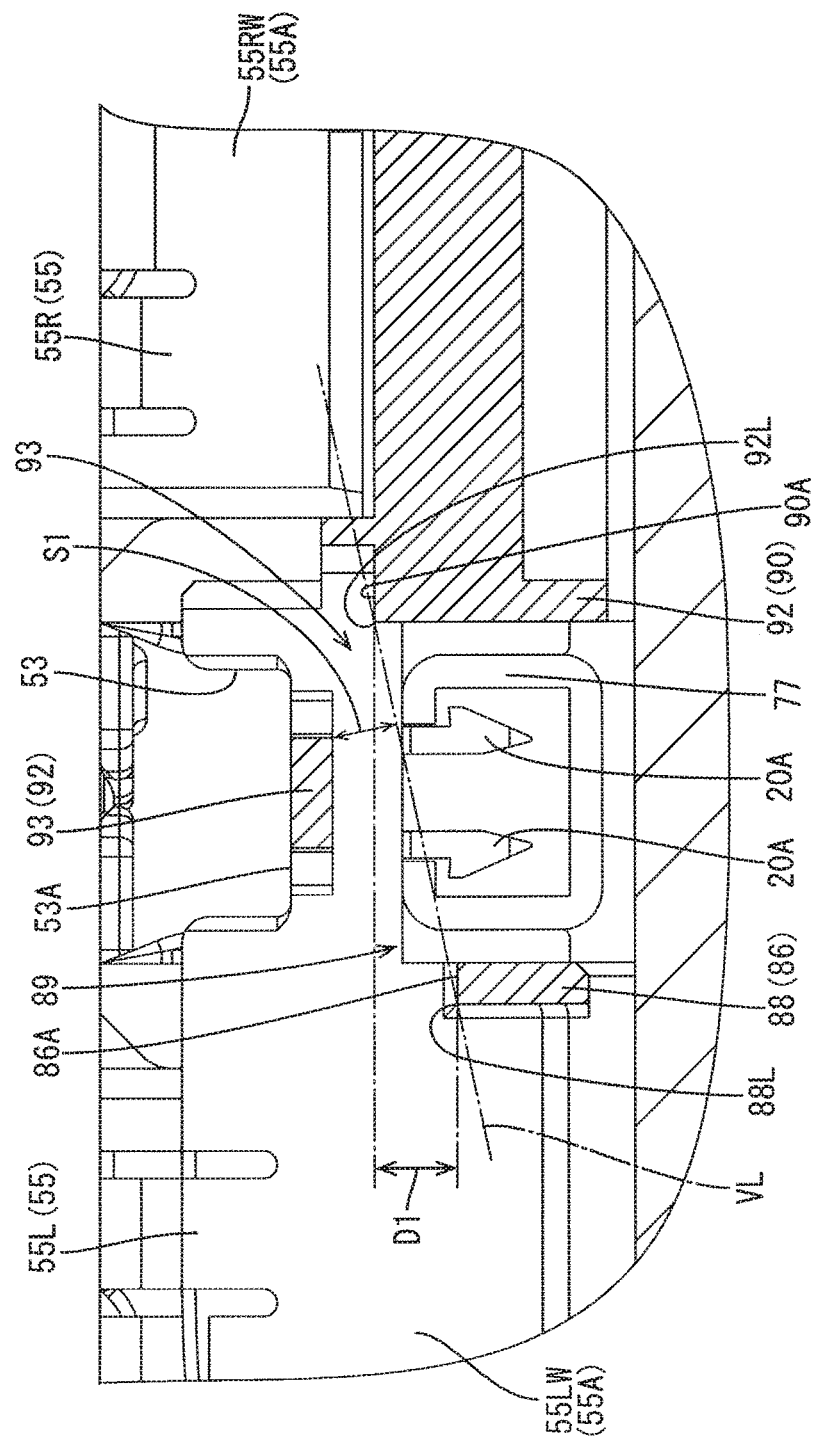
FIG. 8 is a cross-sectional view taken along a line A-A in FIG. 7.
Figure 12:
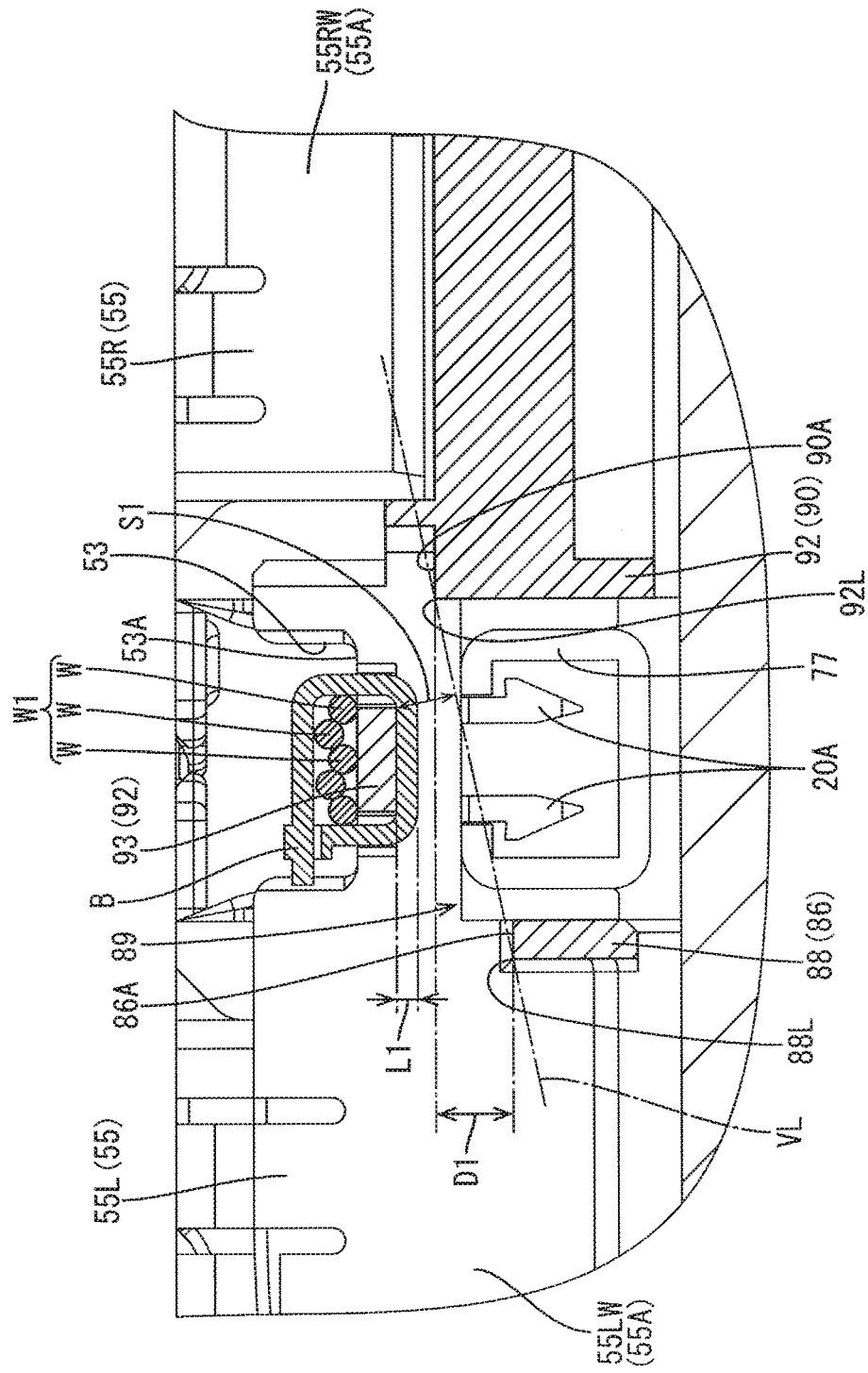
FIG. 12 is a cross-sectional view taken along a line B-B in FIG. 11.

That is, the height dimension of the first reinforcing portion 86 is approximately half of that of the second reinforcing portion 90, and therefore the first insertion hole 89 has a larger opening than the second insertion hole 93. More specifically, as illustrated in FIGS. 8 and 12, an upper end portion 86A of the first front wall 87 and the first side wall 88 of the first reinforcing portion 86 is located farther downward from the main body portion 83 of the extension portion 82 than an upper end portion 90A of the second front wall 91 and the second side wall 92 of the second reinforcing portion 90 is, and therefore the opening of the first insertion hole 89 is larger than that of the second insertion hole 93 by a difference D1 in the height dimension between the first reinforcing portion 86 and the second reinforcing portion 90.

Also, a dimension S1 of the space between the main body portion 83 of the extension portion 82 and an imaginary straight line VL that connects a left-side upper-end edge 88L of the first side wall 88 of the first reinforcing portion 86 (edge portion that constitutes the first insertion hole 89 of the first reinforcing portion 86) and a left-side upper-end edge 92L of the second side wall 92 of the second reinforcing portion 90 (edge portion that constitutes the second insertion hole 93 of the second reinforcing portion 90) is set to be greater than a plate thickness L1 of the binding member B.

That is, the first insertion hole 89 and the second insertion hole 93 are arranged on a straight line so as to face each other, and the binding member B can be passed through the first insertion hole 89 toward the second insertion hole 93 along the first side wall 88 of the first reinforcing portion 86 and the second side wall 92 of the second reinforcing portion 90.

Furthermore, in the present embodiment, as illustrated in FIG. 7, the first reinforcing portion 86 of the wire fixing portion 80 provided at the end portion of the main path 53 is continuous with the outer wall 55LW of the left-side bus bar holding portion 55L and the second reinforcing portion 90 is continuous with the outer wall 55RW of the right-side bus bar holding portion 55R, and therefore rigidity of the front end portion of the main path 53 in the protector body 51 can be improved.

The present embodiment is configured as described above, and the following describes functions and effects of the wire fixing portion 80 of the connection module 20.

As the number of bus bars 21 increases, the more the number of wires W constituting the wire bundle W1 drawn forward from the main path 53 of the connection module 20 increases. If a portion to which the wires W are fixed is supported at only one end, if an external force is applied to the drawn-out wire bundle W1, the portion to which the wire bundle W1 is fixed may be damaged due to flexural deformation or the like. Further, in a case where a cutout or a hole is provided in the portion to which the wire bundle W1 is fixed, the rigidity of the portion to which the wire bundle W1 is fixed further decreases.

However, according to the present embodiment, as illustrated in FIGS. 5 to 14, the wire fixing portion 80 includes the extension portion 82 that extends forward from an end portion of the part of the protector body 51 where the main path 53 is provided such that the wire bundle W1 can be fixed thereto, and the pair of reinforcing portions 85 that are formed to be continuous with the protector body 51 so as to branch from the hook portion 84 that is the extended end portion of the extension portion 82. Therefore, the extension portion 82 to which the wire bundle W1 is fixed can be reinforced by the pair of reinforcing portions 85 to ensure the strength of the extension portion 82.

Further, for example, in a case where a reinforcing portion is provided to be continuous with a midway position of the extension portion, an external force may be likely to act on the extension portion as a result of another member being caught on the extension end of the extension portion, for example. However, according to the present embodiment, the pair of reinforcing portions 85 are provided at the hook portion 84, which is the extended end portion of the extension portion 82, and therefore it is possible to keep another member from being caught on the extension portion 82 and suppress a situation in which an external force is unintentionally applied to the extension portion 82.

Furthermore, according to the present embodiment, the pair of reinforcing portions 85 are provided on respective sides of the extension portion 82 in the left-right direction so as to branch from the hook portion 84 of the extension portion 82 in two directions, i.e., left and right. That is, as compared with, for example, a case where a single reinforcing portion is provided or a reinforcing portion is provided on only one side of the extension portion, the strength of the extension portion 82 can be increased and another member can be kept from coming into contact with the extension portion 82 from both sides thereof.

However, in a case where the pair of reinforcing portions 85 are configured to be continuous with the hook portion 84 of the extension portion 82 and the protector body 51, when the wire bundle W1 and the extension portion 82 are to be bound by wrapping the binding member B, the binding member B needs to be passed through the first insertion hole 89 that is constituted by the first reinforcing portion 86, the extension portion 82, and the protector body 51, and the second insertion hole 93 that is constituted by the second reinforcing portion 90, the extension portion 82, and the protector body 51.

However, according to the present embodiment, as illustrated in FIGS. 8 and 12, the upper end portion 86A of the first front wall 87 and the first side wall 88 of the first reinforcing portion 86 is located farther downward from the main body portion 83 of the extension portion 82 than the upper end portion 90A of the second front wall 91 and the second side wall 92 of the second reinforcing portion 90 is, and therefore the opening of the first insertion hole 89 is larger than that of the second insertion hole 93 by the difference D1 in the height dimension between the first reinforcing portion 86 and the second reinforcing portion 90.

That is, when the wire bundle W1 and the extension portion 82 are to be fixed to each other by wrapping the binding member B, the binding member B can be easily inserted into the first insertion hole 89. Therefore, as compared with, for example, a case where the size of the first insertion hole 89 is the same as or smaller than that of the second insertion hole 93, the operation for fixing the wire bundle W1 to the extension portion 82 can be performed smoothly, easily, and efficiently.

Also, according to the present embodiment, the dimension S1 of the space between the main body portion 83 of the extension portion 82 and the imaginary straight line VL connecting the left-side upper-end edge 88L of the first side wall 88 of the first reinforcing portion 86 and the left-side upper-end edge 92L of the second side wall 92 of the second reinforcing portion 90 is set to be greater than the plate thickness L1 of the binding member B.

That is, the first insertion hole 89 and the second insertion hole 93 are arranged on a straight line so as to face each other, and the binding member B can be passed through the first insertion hole 89 toward the second insertion hole 93 along the left-side upper-end edge 88L of the first side wall 88 of the first reinforcing portion 86 and the left-side upper-end edge 92L of the second side wall 92 of the second reinforcing portion 90.

That is, the first side wall 88 of the first reinforcing portion 86 and the second side wall 92 of the second reinforcing portion 90 can be used as a guide for the binding member B, and therefore the operation for fixing the wire bundle W1 to the extension portion 82 can be performed smoothly and efficiently.

Further, according to the present embodiment, in the central portion of the protector body 51 in the left-right direction in which the main path 53 is provided, the outer wall 51A of the protector body 51 constituted by the outer walls 55A of the bus bar holding portions 55 has a height dimension in the up-down direction that is smaller than the height dimension of the outer walls 55A of the bus bar holding portions 55 located on the left side and the right side, and therefore the protector body 51 may deform along the main path 53 such that the bus bar holding portions 55 approach each other.

However, the first reinforcing portion 86 of the wire fixing portion 80 provided at the end portion of the main path 53 is formed to be continuous with the outer wall 55LW of the left-side bus bar holding portion 55L and the second reinforcing portion 90 is formed to be continuous with the outer wall 55RW of the right-side bus bar holding portion 55R, and therefore rigidity of the front end portion of the main path 53 in the protector body 51 can be improved and the protector body 51 can be kept from deforming along the main path 53 such that the bus bar holding portions 55 approach each other.

OTHER EMBODIMENTS

The technique disclosed in the present specification is not limited to the embodiment described above with reference to the drawings, and encompasses various alterations such as the following.

(1) In the above-described embodiment, the height dimension of the first reinforcing portion 86 located on the left side is smaller than the height dimension of the second reinforcing portion 90 located on the right side, and the first insertion hole 89 is larger than the second insertion hole 93. However, this should not be taken as a limitation, and the height dimension of the second reinforcing portion may be smaller than the height dimension of the first reinforcing portion, and the second insertion hole may be larger than the first insertion hole. Alternatively, the first reinforcing portion and the second reinforcing portion may have the same height dimension, so long as the binding member can be easily passed through the first insertion hole and the second insertion hole.

(2) In the above-described embodiment, the hook portion 84 extending downward is provided at the extended end portion of the main body portion 83 of the extension portion 82, and the pair of reinforcing portions 85 are continuous with the hook portion 84. However, this configuration should not be taken as a limitation, and the pair of reinforcing portions may be directly continuous with the end portion of the main body portion of the extension portion. Alternatively, the pair of reinforcing portions may be continuous with a portion at a midway position of the extension portion, so long as another member can be kept from being caught on the extended end portion of the extension portion.

(3) In the above-described embodiment, the pair of reinforcing portions 85 continuous with the extension portion 82 and the protector body 51 are provided. However, this configuration should not be taken as a limitation, and the number of reinforcing portions continuous with the extension portion and the protector body may be one or three or more, and when the extension portion is protected with a protection wall or the like, the reinforcing portion may be provided on only one side.

(4) In the above-described embodiment, the wires W for detecting and transmitting information regarding the bus bars 21 are fixed to the wire fixing portion 80. However, this configuration should not be taken as a limitation, and wires for detecting and transmitting information regarding the temperature of the power storage elements may be fixed to the wire fixing portion.

LIST OF REFERENCE NUMERALS

- 20: Connection module
- 21: Bus bar
- 40: Insulating protector
- 50: First protector
- 51: Protector body
- 53: Main path (an example of "wiring path")
- 55: Bus bar holding portion
- 55L: Left-side bus bar holding portion (an example of "bus bar holding portion located on one side")
- 55LW: Outer wall of left-side bus bar holding portion (an example of "outer wall of bus bar holding portion located on one side")
- 55R: Right-side bus bar holding portion (an example of "bus bar holding portion located on the other side")
- 55RW: Outer wall of right-side bus bar holding portion (an example of "outer wall of bus bar holding portion located on the other side")
- 70: Power storage element group
- 71: Power storage element
- 80: Wire fixing portion
- 82: Extension portion
- 85: Reinforcing portion
- 86: First reinforcing portion
- 89: First insertion hole
- 90: Second reinforcing portion
- 93: Second insertion hole
- B: Binding member
- VL: Imaginary straight line
- W: Wire
- W1: Wire bundle

What is claimed is:

1. A connection module configured to be attached to a power storage element group that includes a plurality of power storage elements arranged side by side, comprising:
    a plurality of bus bars each connecting adjacent power storage elements among the plurality of power storage elements;
    a wire bundle that is a bundle of wires for transmitting information regarding the plurality of bus bars or the plurality of power storage elements; and
    an insulating protector that holds the plurality of bus bars,
    wherein the insulating protector includes a protector body that insulates the plurality of bus bars from each other and a wire fixing portion that is provided on an outer wall of the protector body at a position of the protector body at which the wire bundle is drawn out from the outer wall of the protector body, and
    the wire fixing portion includes an extension portion to which the wire bundle is to be fixed and that extends outwardly from the outer wall of the protector body in a first direction in which the wire bundle is drawn out from the outer wall of the protector body, and at least one reinforcing portion that extends from the extension portion in a second direction which intersects with the first direction such that the at least one reinforcing portion is continuous with the extension portion and the protector body.

2. The connection module according to claim 1, wherein the at least one reinforcing portion is continuous with an extended end portion of the extension portion.

3. The connection module according to claim 1, wherein the at least one reinforcing portion comprises a first reinforcing portion and a second reinforcing portion provided on respective sides of the extension portion so as to branch from an extension end of the extension portion.

4. The connection module according to claim 3, wherein the wire fixing portion includes a first insertion hole and a second insertion hole, the first insertion hole being defined by the first reinforcing portion, the outer wall of the protector body, and the extension portion, and the second insertion hole being defined by the second reinforcing portion, the outer wall of the protector body, and the extension portion,
    the wire bundle is to be fixed to the extension portion by wrapping a band-shaped binding member that is passed through the first insertion hole and the second insertion hole, and
    the first insertion hole is larger than the second insertion hole.

5. The connection module according to claim 4, wherein the first insertion hole and the second insertion hole are arranged on a straight line so as to face each other.

6. The connection module according to claim 4, wherein a dimension of a space between the extension portion and an imaginary straight line that connects an edge portion of the first reinforcing portion that constitutes the first insertion hole and an edge portion of the second reinforcing portion that constitutes the second insertion hole is greater than a thickness of the binding member.

7. The connection module according to claim 3, wherein the protector body includes a groove-shaped wiring path within which the wire bundle is disposed, and a plurality of bus bar holding portions that individually house the plurality of bus bars and are located on respective sides of the wiring path to be adjacent to the wiring path, the first reinforcing portion is continuous with an outer wall of a first bus bar holding portion, of the plurality of bus bar holding portion, that is located on one side of the wiring path, the second reinforcing portion is continuous with an outer wall of a second bus bar holding portion, of the plurality of bus bar holding portion, that is located on the other side of the wiring path, and the outer wall of the protector body comprises the outer wall of the first bus bar holding portion and the outer wall of the second bus bar holding portion.

8. The connection module according to claim 4, wherein the extension portion includes a main extension portion that extends in the first direction, and a hook portion that extends from an extended end of the main extension portion in a third direction which intersects with the first and second directions, the first reinforcing portion and the second reinforcing portion extend from the hook portion and are provided on respective sides of the hook portion, and the first reinforcing portion is located farther from the main extension portion than the second reinforcing portion is.

9. The connection module according to claim 4, wherein the wire bundle is fixed to the extension portion by wrapping a band-shaped binding member around the wire bundle and the extension portion.

10. The connection module according to claim 4, wherein the wire bundle is fixed on an upper surface of the extension portion, and the first insertion hole and the second insertion hole are provided and communicates below a lower surface of the extension portion.

11. The connection module according to claim 4, wherein each of the first insertion hole and the second insertion hole is a through hole viewed in a plan view of the insulating protector.

12. The connection module according to claim 1, wherein each of the at least one reinforcing portion includes a first end and a second end opposite the first end, and extends between an extended end portion of the extension portion and the outer wall of the protector body, the first end is connected to the extended end portion of the extension portion, and the second end is connected to the outer wall of the protector body, and a through hole is defined by the each of the at least one reinforcing portion, the extension portion and the outer wall of the protector body.

13. The connection module according to claim 12, wherein the extension portion includes an upper surface on which the wire bundle is fixed, and the through hole is provided below the upper surface.

14. The connection module according to claim 3, wherein the first reinforcing portion has an L-shape including a first portion and a second portion intersecting with each other, the first portion extends from the extension end of the extension portion in the second direction, and the second portion extends from an extension end of the first portion toward the outer wall of the protector body and an extension end of the second portion is connected to the outer wall of the protector body.

\* \* \* \* \*